United States Patent [19]

Strand

[11] 3,779,535
[45] Dec. 18, 1973

[54] SAFETY STABILIZER AND SHOCK ABSORBER SYSTEM

[76] Inventor: Walter L. Strand, 16546 Gabarda Rd., San Diego, Calif. 92128

[22] Filed: Dec. 20, 1971

[21] Appl. No.: 209,743

[52] U.S. Cl. .............................. 267/64, 267/DIG. 2
[51] Int. Cl. ........................................... B60g 11/26
[58] Field of Search ................. 267/DIG. 1, DIG. 2, 267/64

[56] References Cited
UNITED STATES PATENTS

| | | | |
|---|---|---|---|
| 3,201,112 | 8/1965 | Woosner | 267/64 R |
| 3,090,611 | 5/1963 | Schultze | 267/64 R |
| 3,128,088 | 4/1964 | Paschakarnis | 267/DIG. 2 |
| 3,328,019 | 6/1967 | Wilson | 267/64 R |
| 3,083,026 | 3/1963 | Broadwell | 267/DIG. 2 |

*Primary Examiner*—Gerald M. Forlenza
*Assistant Examiner*—John Mannix
*Attorney*—Robert L. Parker et al.

[57] ABSTRACT

An improved stabilizer and shock absorber system for road vehicles with spring axles such as automobiles and trucks and particularly but not exclusively adaptable to the rear axles of campers, housecars, trailers, certain trucks and vans where pronounced tendencies to sway, lean and pitch are experienced. The disclosed system employs at least one pair of opposed cylinders which will ordinarily be mounted in front of the rear axle of the vehicle and the cylinders are connected in cross-over arrangement and inclined transversely of the vehicle, that is, upwardly and toward each other, for more efficient reaction to individual wheel movement, recognizing that when one side of the vehicle is lowered, the opposing or driven cylinder, by reason of its inclination, thrusts with a sidewise component force as well as vertical within the limits imposed by the spring suspension to lower the other side of the vehicle and thus to prevent leaning. There is also a pronounced tendency for vehicles such as those mentioned above to exhibit "highway bounce" or "gallop" under certain road and driving conditions, this action involving distinct pivotal movement about the rear and front axle regions, again within limits imposed by the spring suspension, and the cylinders are therefore also inclined longitudinally of the vehicle. Shock absorbing action as such is further accomplished by providing an air cushion at the top of each cylinder.

1 Claim, 3 Drawing Figures

PATENTED DEC 18 1973 3,779,535

INVENTOR.
WALTER L. STRAND
BY Roy L. Knox

SAFETY STABILIZER AND SHOCK ABSORBER SYSTEM

BACKGROUND OF THE INVENTION

Many variant forms of shock absorbers for vehicles have been developed and use of cylinders with cross-over connections is recognized as not broadly new. The prior art stabilizers and/or shock absorbers employing hydraulic cylinders, even auxilliary elements incorporated in the systems all tend to give a harsh and somewhat unsatisfying control of tilt or lean, sway and buffering action. Prior art systems are also heavy and expensive and sometimes complicated and difficult to install and service. There is a need, therefore, for a more efficiently operating, simple, economical, easily installed system which will combine the functions of wheel shock absorption and stabilization against sway, lean and pitching action. As part of the background of this invention it is at least interesting that the advantage of tilting the cylinders was discovered before the theory of how the tilting functions was developed.

SUMMARY OF THE INVENTION

As claimed, this system satisfies the aforementioned need and comprises a pair of cylinders incorporated with the suspension system and connected in opposed crossover relationship by flexible hoses, the cylinders being inclined toward each other at the top, and the cylinders as detailed in this disclosure are disposed just forwardly of the rear axle and inclined toward the front, for purposes set out in the specification. The shock absorbing function is accentuated by providing for an air cushion in each cylinder.

DETAILED DESCRIPTION OF A PREFERRED EMBODIMENT

Figure 1:
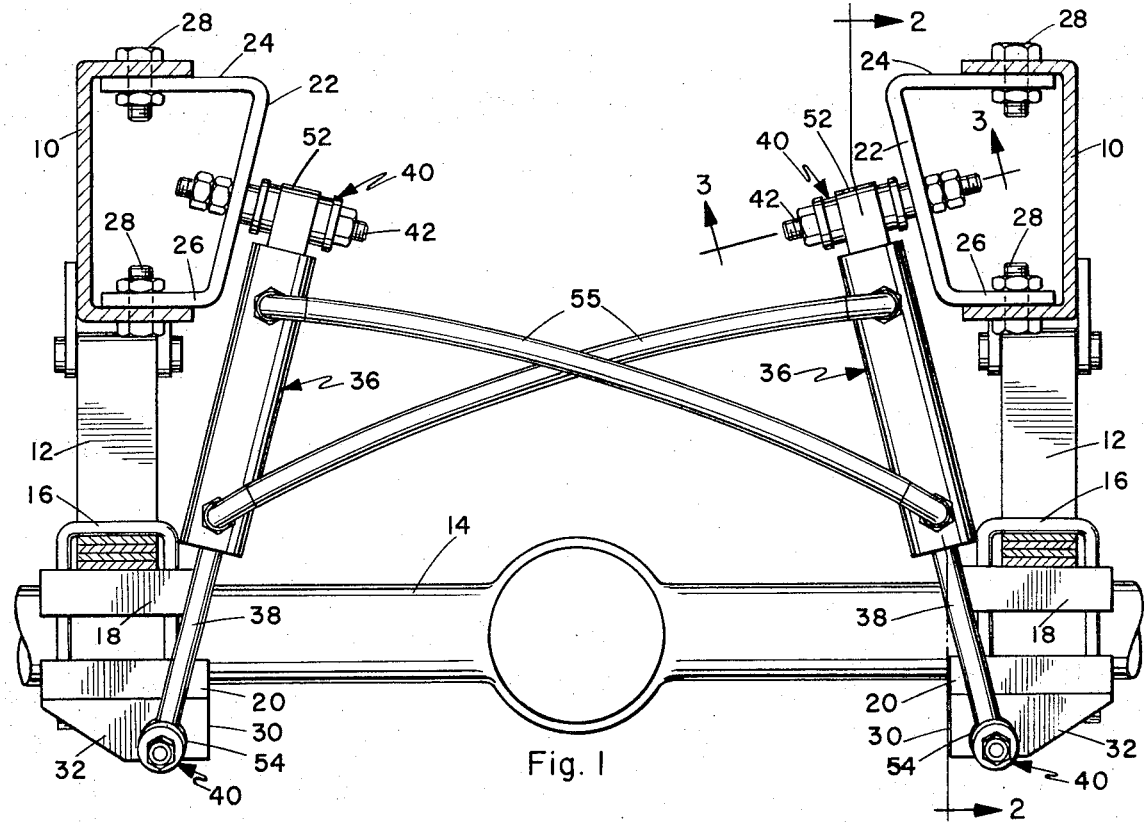
FIG. 1 is a front view of the stabilizer and shock absorber system applied to a vehicle axle and adjacent frame and suspension structure.
Figure 2:
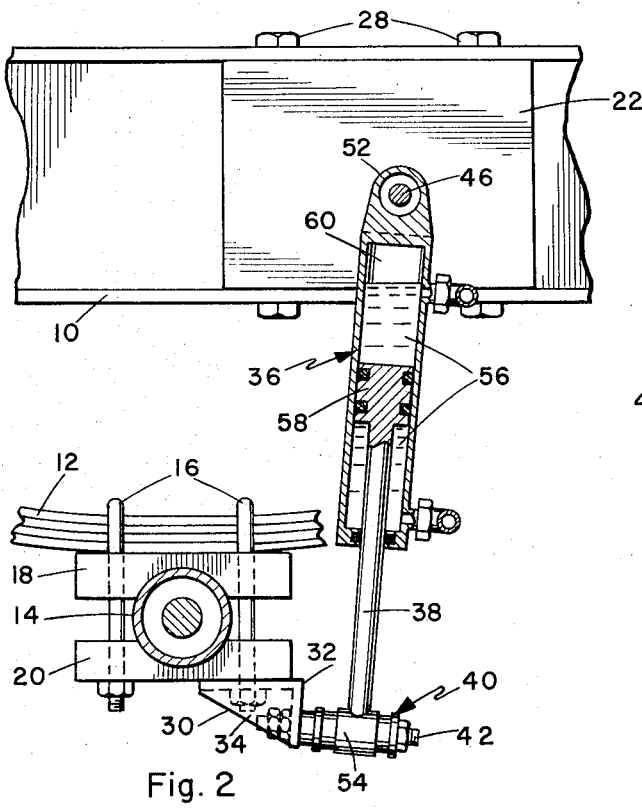
FIG. 2 is a sectional view taken on line 2—2 of FIG. 1.

Referring now to the drawing, the invention is illustrated as incorporated with a vehicle frame channel members 10 fragmentarily represented along with leaf spring assemblies 12 shackled thereto and centrally affixed to a rear axle housing 14 by U-volts 16 along the with a saddle plate 18 and bottom clamp 20, the latter being best shown in FIG. 2. The structure described in the immediately foregoing sentence is of course duplicated on the other side of the vehicle.

To mount the present stabilizing and shock absorbing system on such a vehicle suspension arrangement, a pair of upper attachment brackets 22 are provided, these brackets having integral horizontal plate-like arms 24 and 26 bolted as at 28 to the frame channel members. At the underside of the bottom clamp plates 20 a pair of lower attachment brackets 30 are provided. These lower brackets 30 are essentially angle plates apertured to accept the U-bolts 16 and having an inclined wall 32 and a reinforcing side wall 34.

Figure 3:
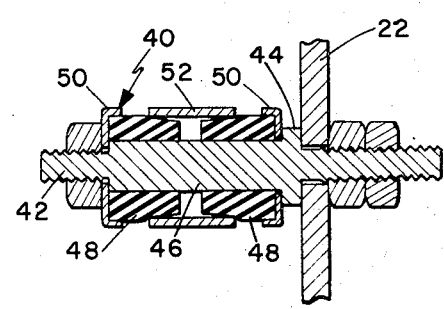
FIG. 3 is an enlarged sectional view taken on line 3—3 of FIG. 1.

A pair of cylinders, generally indicated by the numeral 36, are secured to and between the brackets 22 and 30 at each side of the vehicle. The cylinders 36 and the piston rods 38 thereof are shown connected to the brackets 22 and 30 by bolt assemblies 40 detailed in FIG. 3, each of which may be identical.

Each bolt assembly 40 includes a double ended stud bolt 42 with the required nuts, an enlargement or stop 44 and a plain cylindrical portion 46 on which a pair of resilient bearing sleeves 48 are clamped between cup washers 50. The bearing terminals 52 and 54 of the cylinders and pistons, respectively, ride on the resilient bearing sleeves 48.

The cylinders 36 are connected by flexible hoses 55, each connecting the upper portion of one cylinder with the lower portion of the other cylinder in a top to bottom cross-over arrangement. The hoses are carefully limited in size so that the very considerable resultant resistance to fluid flow therein adds a buffering component.

As a result of this arrangement any movement of one side of the vehicle relative to the axle will force a flow of hydraulic fluid 56 into the opposite end of the other, or driven, cylinder thus moving the driven cylinder in the same general upward or downward direction as the originally mentioned movement. This effectively stabilizes the vehicle against transverse tilt or sway. Improved performance is achieved by inclining the cylinders transversely of the vehicle, that is, with the upper ends inclined toward each other at an angle on the order of 10° from the vertical. Theoretically, the driving cylinder, responding to the lowering of one side of the vehicle relative to the axle drives fluid into the driven cylinder and the latter thrusts downwardly but also with a sidewise component for better counteraction of the tilting moment on the vehicle. The spring suspension restrains the side thrust but there is sufficient resilience and play in the suspension structure to resolve in the resultant actual thrust being at a small angle relative to the vertical and this play and resilience, likely to increase with the age of the vehicle, is fortunately accompanied by increased effectiveness of this system, to counteract increasing hazards. The inclination of the cylinders also restrains the body of the vehicle against horizontal movement relative to the axle.

It should be noted in relation to this invention that the surprising advantages of tilting the cylinders was first noticed in actual tests and the reasons for the increased efficiency are still open to question. Another theory, which may be coincidentally valid is that the inclination of the cylinders results in movement of the inclined piston a distance less than the vertical movement of the axle, calculable as the cosine of the angle, and therefore less harsh in the stabilizing action. In this regard, the harshness of reaction of the systam is radically lessened or relieved by provision of a small air pocket 60 at the upper end of each cylinder. This feature, which is easily accomplished when initially filling the system or by bleeding after fully filling, introduces some resilience into the system and prevents the "thud" otherwise experienced in the vehicle whenever even one wheel is sharply raised or lowered when the vehicle is travelling. The small air cushion provides a shock absorbing action accomodating small movements of the frame but any great movement brings the cross-over stabilizing action into play to prevent lean or sway.

The cylinders are mounted in front of the rear axle and the inclined wall 32 of the lower bracket with corresponding placement of the upper bracket 22 is such the the cylinders are also inclined longitudinally of the vehicle, that is, upwardly and forwardly as indicated in FIG. 2. Like the transverse inclination this longitudinal inclination serves to improve the control of "highway bounce" or "gallop" of the vehicle under adverse road and driving conditions, ostensibly for similar reasons, it being recalled that under such conditions the vehicle tends to pivot about the axle region. In many vehicles of the types named above it is practical to mount similar cylinders at the front axle region, minor adaptation of the bracket mounting being sometimes required, and in this case the front cylinders are inclined toward the rear since the principal movement sought to be controlled is that "nose diving" or bounce movement of the front end of the vehicle which is very disconcerting and dangerous.

This longitudinal inclination of the cylinders also helps to restrain the body from shifting longitudinally relative to the axle.

The construction and method of using this invention will be obvious from the foregoing and further description appears unnecessary.

I claim:

1. A combined stabilizer and shock absorber system for a road vehicle having a frame with first and second sprung axles, said system comprising:

a pair of hydraulic cylinders with pistons operatively mounted on and between the frame and one of the axles in opposed relation adjacent the ends of said one axle, the cylinders being upwardly inclined to extend longitudinally of the vehicle toward the other axle, and being upwardly and inwardly inclined laterally of the vehicle;

said cylinders having liquid therein incompletely filling the cylinders and having an air cushion in each cylinder, the air cushion being in direct contact with the liquid, and being separated from the piston only by the liquid; and top to bottom cross-over liquid conductors connecting the cylinders in cross-coupled relationship so movement of one piston in the associated cylinder produces a transfer of liquid to the other cylinder to effect a generally corresponding motion of the other piston;

whereby cushioning as well as improved anti-tilt stabilization of the vehicle is obtained.

* * * * *